United States Patent [19]
Cartmell et al.

[11] Patent Number: 5,797,564
[45] Date of Patent: Aug. 25, 1998

[54] SYSTEM FOR BACKDRIVE OF FLIGHT DECK CONTROLS DURING AUTOPILOT OPERATION

[75] Inventors: Daniel H. Cartmell, Bellevue; David B. Borgens, Auburn; Henning Buus; Keith S. Duffy, both of Woodinville, all of Wash.; Mark E. Gast, Seabrook, Tex.; Neal V. Huynh; David W. Lochtie, both of Bellevue, Wash.; Clifton A. Piersbacher, Seattle, Wash.

[73] Assignee: The Boeing Company, Seattle, Wash.

[21] Appl. No.: 441,681

[22] Filed: May 15, 1995

[51] Int. Cl.$^6$ .................................................. B64C 13/16
[52] U.S. Cl. ............................................................. 244/223
[58] Field of Search ................................ 244/236, 223, 244/228, 232, 233, 234, 237, 196, 197; 74/471 XY, 89.2, 89.22

[56] References Cited

U.S. PATENT DOCUMENTS

| | | | |
|---|---|---|---|
| 4,345,195 | 8/1982 | Griffith et al. | 244/223 |
| 4,494,061 | 1/1985 | Kaye. | |
| 5,076,517 | 12/1991 | Ferranti et al. | 244/223 |
| 5,082,208 | 1/1992 | Matich | 244/194 |
| 5,197,697 | 3/1993 | Lyloc et al. | |
| 5,414,620 | 5/1995 | Kauffman | 244/223 |
| 5,493,497 | 2/1996 | Buus | 244/194 |
| 5,560,570 | 10/1996 | Pierson et al. | 244/194 |

OTHER PUBLICATIONS

Hughes, D., Fly-By-Wire 777 Keeps Traditional Cockpit, *Aviation Week and Space Technology*, May 1, 1995.

*Primary Examiner*—Galen L. Barefoot
*Attorney, Agent, or Firm*—Christensen O'Connor Johnson & Kindness PLLC

[57] ABSTRACT

A system for backdriving the flight deck controllers of a fly-by-wire aircraft that is under autopilot control to provide a pilot with tactile and visual feedback of autopilot activity. The system, distributed between the aircraft primary flight computers and the autopilot flight computer, uses actuators mechanically coupled to each flight deck controller to position the flight deck controller to mimic manual operation of the flight control surfaces. Additionally, the system allows smooth disengagement of the autopilot and transfer of the aircraft to pilot control when the pilot takes control of any flight deck controller by moving it from a backdrive system-commanded position by a predetermined displacement for a predetermined time.

12 Claims, 6 Drawing Sheets

SYSTEM FOR BACKDRIVE OF FLIGHT DECK CONTROLS DURING AUTOPILOT OPERATION

The invention provides a system for the simulation of normal movement of flight deck controllers during autopilot operation of an aircraft that is equipped with a fly-by-wire flight control system. The system of the invention is particularly suited for fly-by-wire flight control systems that incorporate traditional column, wheel, and pedal flight deck controls.

BACKGROUND OF THE INVENTION

The majority of aircraft utilize mechanical flight control systems that incorporate direct mechanical linkages to physically connect flight deck controls with the flight control surfaces through power control units. In normal operation, this type of flight control system provides the pilot with tactile and visual information regarding the position of the flight control surfaces through the orientation of the flight deck controls. Because most pilots are familiar with the use of such mechanical control systems, the system also provides the pilot with a certain level of psychological assurance that it is operating correctly. Tactile and visual feedback of system operation is provided even when the autopilot is engaged. Specifically, the autopilot system is interfaced with the flight deck controls through actuators that are connected in parallel with the system mechanical linkages. Thus, the autopilot actuators drive the flight control surfaces; and the column, wheel, and pedals of the flight deck controls are driven by the system's mechanical linkages in accordance with the flight control surfaces. A pilot, in tactile and visual communication with the controls, therefore maintains an awareness of autopilot activity and is reassured of appropriate behavior, or alerted when the behavior of the autopilot appears inappropriate.

An alternative flight control system does not include direct mechanical linkages between the pilot's controls and the aircraft control surfaces. Instead, in this system, the pilot's commands, input through flight deck controls, are converted to electrical signals, which are then electronically processed to produce commands for control units that in turn appropriately orient flight control surfaces. In this system, there is nothing to drive the flight deck controls when the autopilot is operating. Thus, in this electronically driven flight control system, also known as a "fly-by-wire" flight control system, the pilot receives no tactile or visual feedback through column, wheel, and pedal flight deck controls that provide information regarding the operation of the autopilot. Instead, these flight deck controls are stationary while the autopilot is engaged. Without the visual and tactile information provided through feedback via the flight deck controls, the pilot cannot maintain awareness of autopilot activity. Consequently, the pilot may not be aware of inappropriate autopilot activity and may not be as aware of the orientation of aircraft control surfaces. These situations are generally unacceptable to pilots. Also, when the pilot elects to disengage the autopilot, the flight deck controls may be in their neutral or "rest" positions while the autopilot may have set corresponding flight control surfaces at different positions, not corresponding to the flight deck controls. Thus, on disengagement of the autopilot, there may be an abrupt adjustment between the positions of flight deck controls and flight control surfaces to bring these into correspondence, potentially causing passenger discomfort and alarm.

There exists a need for a system that provides a pilot with an awareness of autopilot activity in a fly-by-wire flight control system, especially one that utilizes traditional column, wheel and pedal flight deck controls. The system should be safe, reliable, compatible with, and readily integrated into, the fly-by-wire control system. Desirably, the system should prevent the possibility of abrupt changes in orientation of aircraft flight control surfaces on disengagement of the autopilot.

SUMMARY OF THE INVENTION

The invention provides a system for backdriving the column, wheel, and pedal flight deck controllers, of an aircraft equipped with a fly-by-wire flight control system, to provide a pilot with an awareness of autopilot activity, when the system is under control of an autopilot. The system is of the closed-loop feedback-type with implementation distributed between a primary flight computer and an autopilot flight director computer of the aircraft.

The system of the invention orients flight deck controllers of an aircraft that is flying under autopilot control to correspond with the relative orientation of those flight control surfaces that the flight deck controllers would ordinarily control, when the aircraft is under pilot control. As a result, a pilot in tactile and visual communication with the controllers will immediately be aware of the position of the flight control surfaces when the aircraft is under autopilot control.

The system of the invention may be readily overridden by appropriate pilot action. Thus, in the event that a pilot must regain immediate manual control of the aircraft, the system of the invention allows virtually immediate change of control to the pilot when the primary flight computer senses that any of the flight deck controllers have been moved from orientations set by the inventive system.

In accordance with the invention, backdrive of the flight deck controllers commences with a command signal from the autopilot flight director computer to a primary flight computer providing information on orientation of the flight control surfaces under autopilot control. The primary flight computer sends a command activation signal and a position command signal for each flight deck controller, to a backdrive controller, associated with the autopilot flight director computer. The backdrive controller sends a command signal to the backdrive actuator, which is mechanically coupled to a flight deck controller, to apply torque to move the flight deck controller. The backdrive actuator, typically incorporating an electromechanical clutch that controls engagement between a drive motor and an output crank, applies a torque through mechanical linkages to the flight deck controller to move the controller to a desired orientation or position. A position transducer, in mechanical communication with the flight deck controller, senses the position of the flight deck controller and sends an analog electrical signal to an actuator control electronic unit, that converts the signal into a digital format and sends the digitized flight controller position information back to the primary flight computer. The primary flight computer forwards the information regarding the position of the flight deck controller, as relayed to it through the actuator control electronic unit, to the backdrive controller. The backdrive controller continually adjusts the command signal to the backdrive actuator based on the difference between the command and measured position of the flight deck control as received from the primary flight computer, and rate feedback from the backdrive actuator, thereby completing the closed-loop feedback control system of the invention.

In order to disengage the closed-loop backdrive control system of the invention, a pilot may initiate a command that is sent from the autopilot to the primary flight computer, which in turn disengages the backdrive system, thereby allowing the pilot to resume manual operation of the aircraft. The pilot is also able to disengage the autopilot and the backdrive system by taking physical control of any of the flight deck controllers and moving the controller away from the position dictated by the backdrive system. The primary flight computer senses the difference between an expected position of the controller and the position to which the pilot has moved the controller. When this difference exceeds a threshold value for a certain time period, the autopilot is disengaged.

The system of the invention provides a solution to a significant shortcoming in fly-by-wire autopilot systems by providing continuous closed-loop feedback control of actuators that move the flight deck controllers to mimic manual operation. By accurately positioning the flight deck controllers during autopilot operation, the system allows a smooth changeover to pilot control at autopilot disengagement and avoids abrupt changeovers that might have occurred if the positions of the flight deck controllers were not in correspondence with their respective flight control surfaces.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

The backdrive system of the invention controls and moves the column, wheel, and pedal flight deck controllers of an aircraft using a fly-by-wire flight control system, when the aircraft is under control of an autopilot. Mechanical aspects of the backdrive system may be better appreciated with reference to the embodiments shown in FIGS. 1, 2, and 3. An embodiment of the overall feedback control scheme is shown in FIG. 4.

Figure 1:
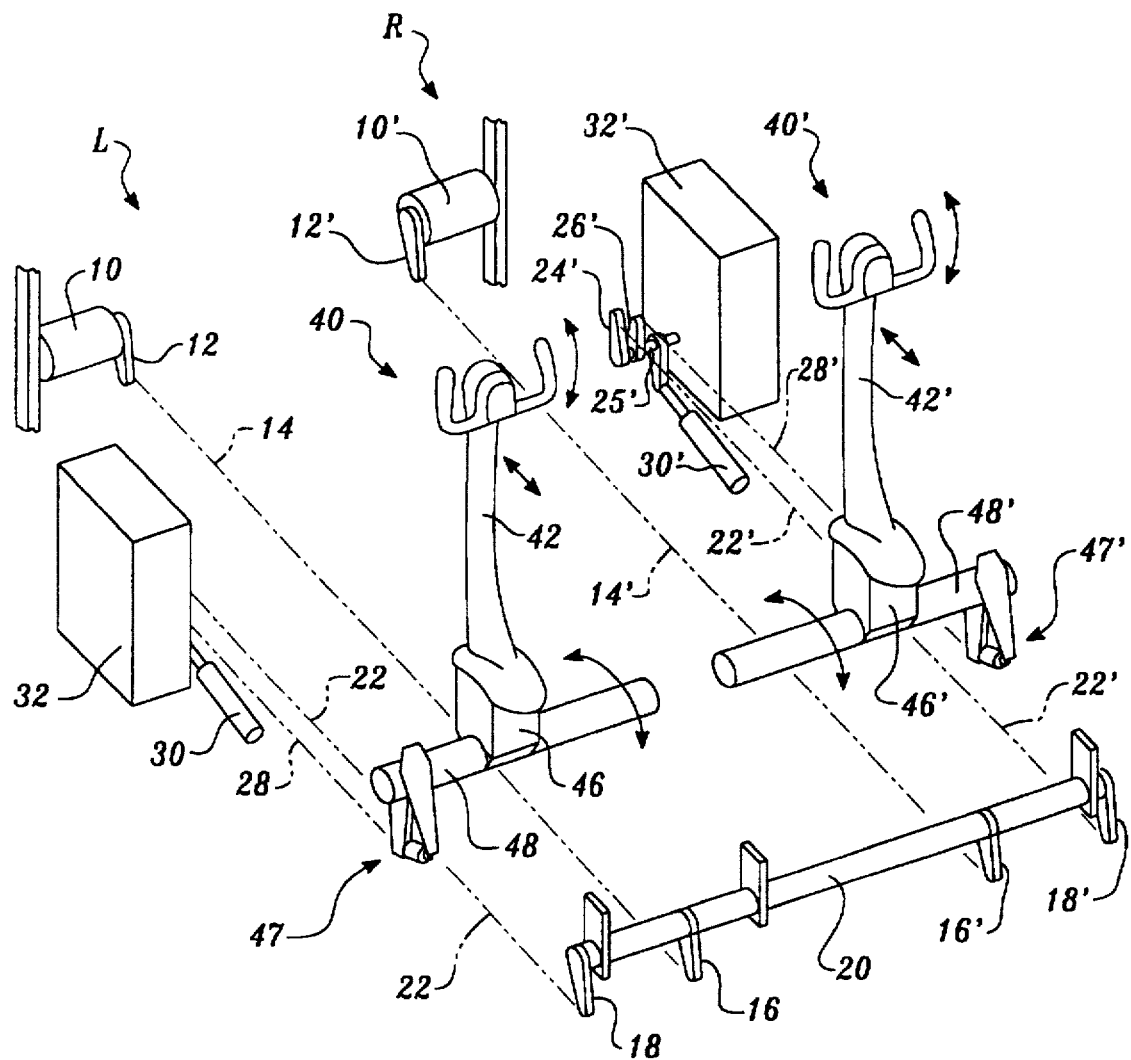
FIG. 1 schematically depicts mechanical aspects of a column backdrive installation according to the invention.
Figure 2:
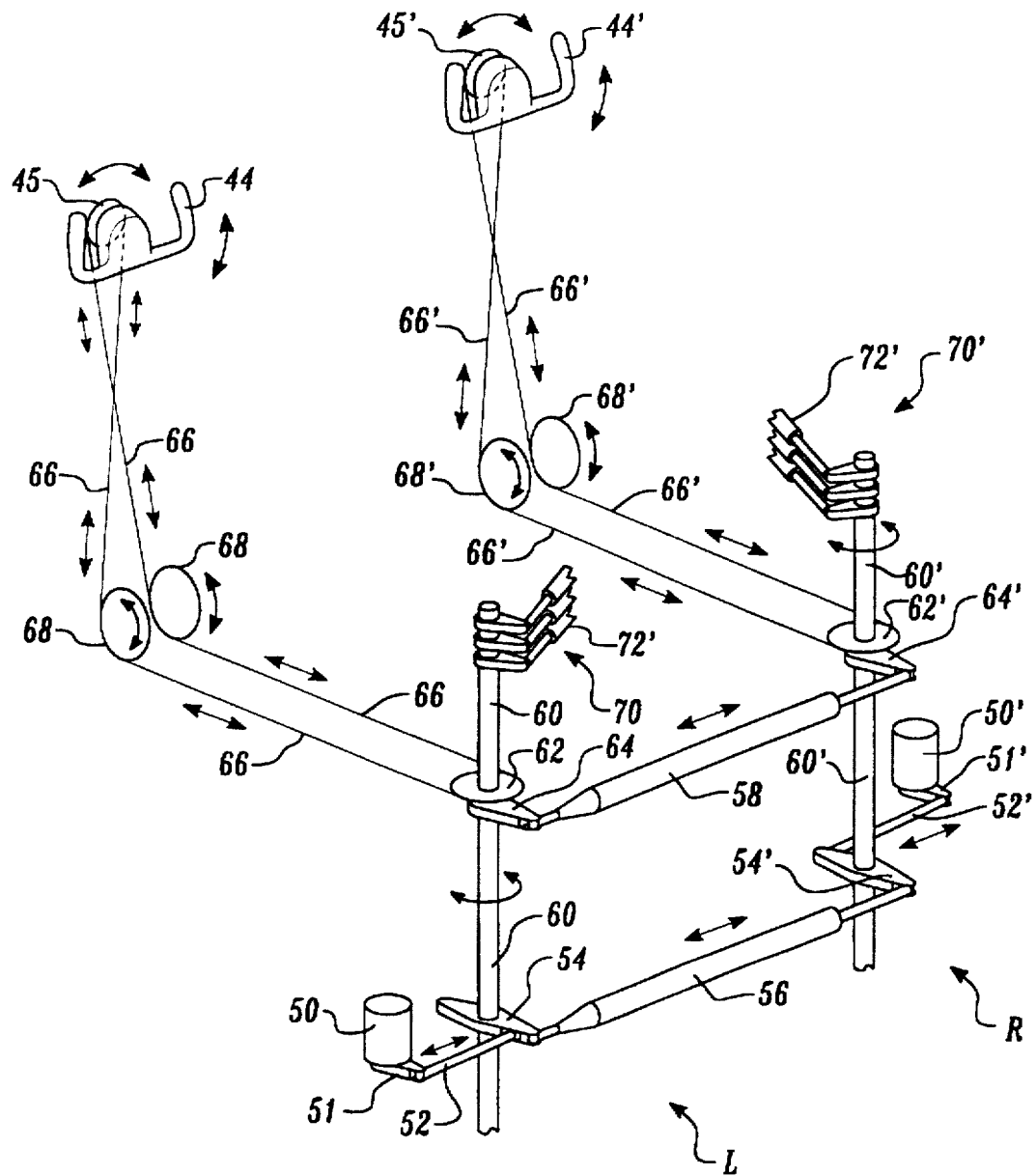
FIG. 2 schematically depicts mechanical aspects of a wheel backdrive installation, according to the invention.
Figure 3:
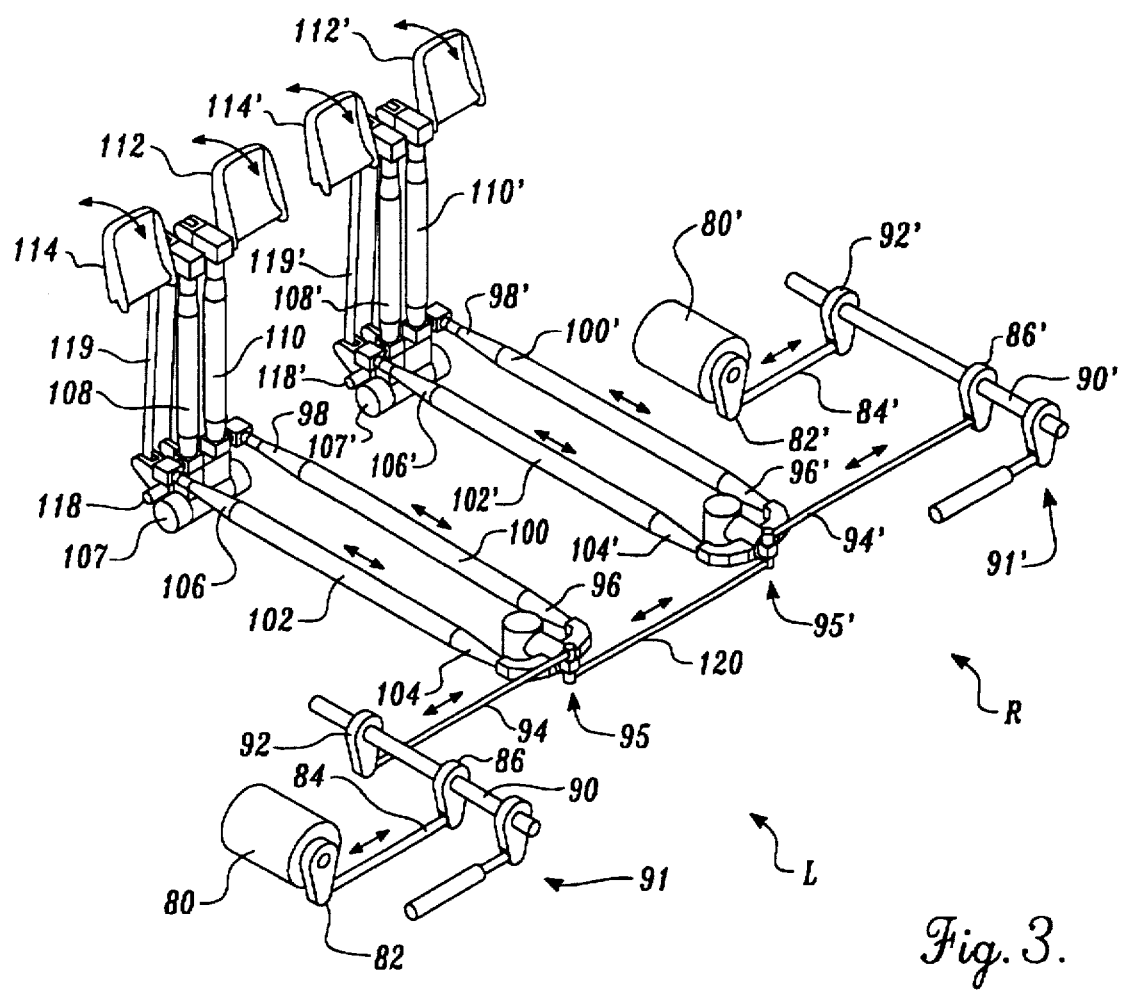
FIG. 3 schematically depicts mechanical aspects of a rudder pedal backdrive installation, according to the invention.
Figure 4:
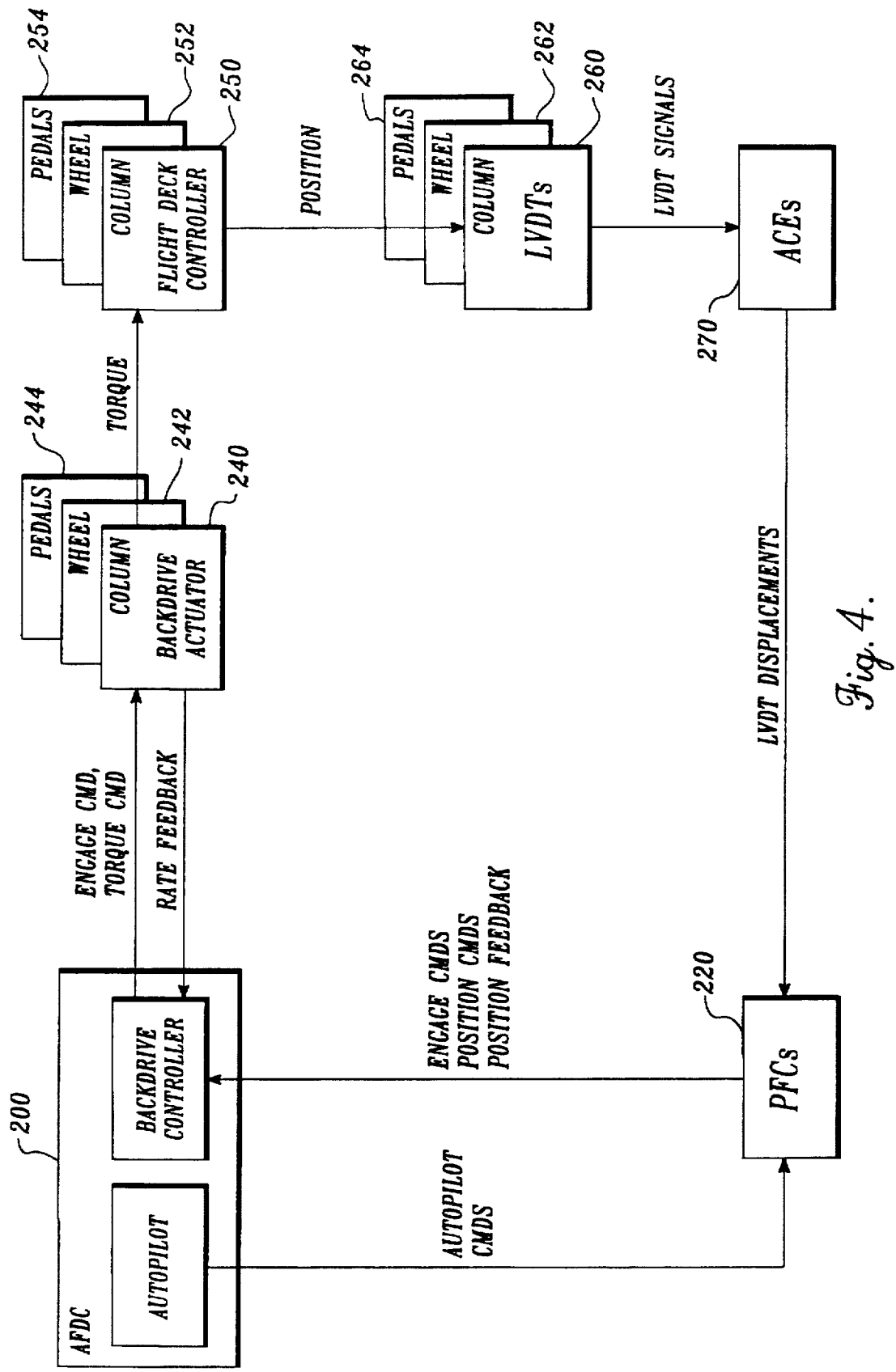
FIG. 4 is a block diagram showing details of an embodiment of the closed-loop feedback control system of the invention.

With respect to FIGS. 1, 2, and 3, each shows both left L and right R hand controllers, relative to a pilot or copilot seated at (i.e., aft of) the controllers. To avoid duplicative explanation of the backdrive components of the controllers, the following descriptions focus on the left-hand controllers and follow their numerical designations. However, where appropriate, the description may also refer to the corresponding right side controller, with identical but primed numerical designations. The term "longitudinal" means substantially parallel to a longitudinal axis of the aircraft, and the term "lateral" means substantially perpendicular to the longitudinal axis (i.e., inboard and outboard).

FIG. 1 shows an embodiment of mechanical aspects of the invention as it relates to the control of the orientation of flight deck control columns when the aircraft is under control of the automatic pilot. Usually, the aircraft has two vertical columns 40 mounted side-by-side on the flight deck, as shown, to control aircraft pitch. A wheel 44 is rotatably mounted near the upper end 42 of column 40 while the lower end 46 of the column is fixed to the outer surface of a laterally extending cylindrical shaft 48 that can be rotated to a limited degree about its axis. Thus, when shaft 48 rotates, column 40 moves arcuately rearward or forward, depending on direction of shaft rotation.

According to the invention, at least one backdrive actuator 10 is fixedly mounted to drive each of the left L and right-hand R column controllers. The actuators are interconnected, as will be explained, so that only one actuator could drive both columns, if one actuator fails. Preferably, the actuators are mounted outboard and forward of the columns. Preferably, the actuators each incorporate an electromechanical clutch that controls engagement between a drive motor and crank arm 12. When the clutch is engaged, drive motor torque is applied to move the end of the crank arm arcuately. Actuator 10 is mounted so that arm 12 moves in a vertical, longitudinal plane. An elongate horizontal rod 14 extends longitudinally aft from one end mechanically coupled to crank arm 12, to another end mechanically coupled to crank arm 16, which is fixedly mounted on a rotatable, lateral, horizontal shaft 20. Shaft 20, rotatably mounted to the aircraft frame, is located aft of the columns and is parallel to shaft 48. Thus, movement of crank arm 12 is translated, via rod 14 and crank arm 16, into opposite rotating movement of shaft 20. A crank arm 18 is fixedly mounted to shaft 20 and axially spaced apart from crank arm 16. Referring to right-hand controller R, for details more clearly shown due to drawing orientation, one end of a longitudinally extending horizontal rod 22' is mechanically coupled to a free end of crank arm 18', and another end of rod 22' is mechanically coupled to a crank arm 24', which is fixedly mounted to a laterally extending horizontal rotatable shaft 25'. Shaft 25' is parallel to shaft 20 and rotatably mounted to the aircraft frame forward of column 40'. Thus, rotating movement of shaft 20 is translated via crank arm 18', rod 22', and crank arm 24' into opposite rotational movement of shaft 25'. A feel and centering unit 32' is fixedly coupled to an outboard end of shaft 25' and applies a countertorque that progressively resists rotation of shaft 25' from a null position that coincides with the "rest" or upright position of the column that is often referred to as "detent." As will be explained later, rotation of shaft 25' results in movement of the column. Rotatable shaft 25' also has mounted fixedly thereto an end of a second crank arm 26', spaced from and in fixed relationship with crank arm 24'. A longitudinally extending horizontal rod 28' has one end mechanically coupled to the other end of crank arm 26', and another end coupled to an end of crank arm 47' that is fixedly attached to shaft 48', on which column 40' is mounted. Rotation of shaft 25' is translated, via crank arm 26', rod 28', and crank arm 47', into opposite rotational movement of cylindrical shaft 48'. This movement of shaft 48' arcuately moves column 40', mounted thereon, backward or forward relative to a seated pilot, depending upon direction of rotation of the shaft.

In a further, hereinafter described, important aspect of the invention that provides feedback control, a position transducer 30', such as a linear variable differential transformer or a rotary variable differential transformer, measures movement of column 40'. In the embodiment shown, the position transducer is fixedly mounted near shaft 25', although the transformer can be located elsewhere, as long as it is able to perform the function of sensing movement of the column. Thus, as shown, the transformer senses movement of shaft 25', which is used to estimate movement of controller 40'.

The invention also provides systems for backdriving the flight deck wheel controllers. Essentially, backdrive actuators cause limited rotational movement of two parallel vertical shafts, mechanically coupled by two horizontal coupling rods, so that the rotation of these shafts is translated, via pulleys and cables, to corresponding wheel rotation. An embodiment of this system is shown, schematically, in FIG. 2. A backdrive actuator 50, similar to that previously described, is fixedly attached to the aircraft below and aft of wheel 44. The actuator has a crank arm 51, and is oriented so that rotation of the actuator shaft causes the crank arm to move arcuately in a horizontal plane. The end of the crank arm 51 is mechanically coupled to an end of an inboard extending horizontal rod 52 that has another end coupled to linkage 54 that is fixedly mounted to a vertical rotatable shaft 60. As crank arm 52 moves in response to applied torque, linkage 54 moves correspondingly to cause limited rotational movement of shaft 60 about its axis. Thus, as rod 52 moves inboard, shaft 60 rotates counterclockwise, and vice versa. The movement of shaft 60 is duplicated in a second parallel vertical rotatable shaft 60', spaced from and inboard of shaft 60, through a first horizontal coupling rod 56 extending laterally between the shafts with one end mechanically coupled to linkage 54 and the other end mechanically coupled to linkage 54', that is fixedly mounted to and extends from shaft 60'. Thus, movement of crank arm 52 of actuator 50 causes both shafts 60 and 60' to rotate.

A second linkage 64, axially spaced from and above linkage 54, is likewise fixedly mounted to rotatable shaft 60, and is also mechanically coupled to one end of a second laterally extending horizontal coupling rod 58, parallel to rod 56. The other end of second coupling rod 58 is attached to a linkage 64' that is mounted fixedly to and extends outwardly from rotatable shaft 60'. The first and second coupling rods move in unison to perform essentially the same function and provide redundancy.

A pulley 62 is nonrotatably mounted to cylindrical shaft 60 and guidedly moves an endless cable 66 that is connected to a pulley 45 that turns a wheel controller 44. The cable extends around the rim or circumferential perimeter of pulley 62 in a peripheral groove (not shown) and extends longitudinally and horizontally forward toward a location beneath the wheel 44. Cable 66 is guided by two parallel guiding pulleys 68, each rotatable about a common horizontal axis, so that the cable turns vertically upward toward wheel 44. Cable 66 is guided around a peripheral groove (not shown) in wheel pulley 45, located immediately behind wheel 44. Wheel pulley 45 is mechanically coupled to wheel 44 so that rotational movement of pulley 45 about its axis translates to corresponding movement of wheel 44. Thus, clockwise rotational movement of shaft 60 causes counterclockwise rotation of right side pulley 68 and corresponding clockwise rotation of left side pulley 68. This in turn causes counterclockwise rotation of pulley 45 and wheel 44.

As part of the feedback control system of the invention, as will be explained later, vertical shafts 60 and 60' are each supplied with positional transducers 70 and 70'. These transformers, which may be linear variable differential transformers (shown), or rotary variable differential transformers, detect rotational movement of shafts 60 and 60', which is related to rotational motion of wheels 44 and 44'.

An embodiment showing mechanical aspects of the backdrive system according to the invention for controlling the movement of pedal controllers is shown in FIG. 3. In general, each of the L and R pedal controllers is in an "L"-shaped configuration with vertical pedal arms 108, 110, with pedals 112, 114 at their upper ends, forming the vertical limb of the "L"; a rotatable cylindrical pivot 107 at the crook of the "L" fixedly coupled to lower ends of the pedal arms; and the horizontal longitudinally extending rods 100 and 102, forming the horizontal limb of the "L", connected to the pedal arms at the crook of the "L," so that reciprocal movement of the rods causes the pedals to move arcuately backward and forward by rotating the pedal arms about the pivot. The vertical limb of the "L" also includes a pair of vertical bell crank arms 119 (only one shown for each of the two sets of pedal controllers L, R) each having one end mechanically coupled to a pedal, and extending downward for mechanical attachment to a rotatable bell crank shaft 118, near cylindrical pivot 107.

In the embodiment shown, actuators 80 are fixedly located outboard of and near the aft ends of the pedal levers. More specifically, a backdrive actuator 80, of the type described above, has a crank arm 82 that moves arcuately in a vertical, lateral plane. An end of the crank arm is mechanically coupled to an end of a laterally extending horizontal rod 84. The other end of rod 84 is mechanically coupled to crank arm 86 that is fixedly mounted to a rotatable, longitudinally extending, horizontal shaft 90. Shaft 90 is parallel to and outboard of the control arms 102 and 100 of the pedal controller, and is rotatably attached to the aircraft. Thus, applied torque of actuator 80 results in movement of crank arm 82, rod 84, and crank arm 86, thereby causing opposite rotational movement of shaft 90. Also mounted on shaft 90 is a second crank arm 92, spaced from crank arm 86, with an end thereof fixedly mechanically coupled to laterally extending horizontal rod 94. The other end of rod 94 is mechanically connected to the crook of a "V"-shaped coupling 95 that is located at the aft ends 96 and 104 of longitudinal horizontal rods 100 and 102. Thus, clockwise rotational movement of shaft 90 is translated via crank arm 92, rod 94, and coupling 95 into forward movement of horizontal rod 100 and corresponding rearward movement of lever 102. Likewise, counterclockwise movement of shaft 90 causes rearward movement of rod 100 and corresponding forward movement of rod 102. An opposite, forward end 98 of rod 100 is mechanically coupled near a lower end of vertical pedal arm 110 so that, when rod 100 reciprocates, pedal arm 110 pivots around shaft 107 and moves arcuately backward or forward. Pedal 112 is attached to the upper end of pedal arm 110. Likewise, a forward end of rod 102 is mechanically coupled near a lower end of pedal arm 108 so that reciprocation of rod 102 causes the pedal arm to pivot around shaft 107 and thereby move arcuately backward or forward. A pedal 114 is mounted at the upper end of pedal arm 102.

Backdrive actuator 80 can also drive the right-hand corresponding controller R in the event controller 80' is not operational. This is achieved with a laterally extending coupling rod 120 that couples the left-hand pedal controllers L to the right-hand pedal controllers R. Coupling rod 120 extends between the controllers so that one end of the rod is fixedly attached to coupling 95, and the other end is fixedly attached to a like coupling 95' of the right-hand side pedal controllers R. Thus, as for the other systems described above, this system also provides redundancy. A position transducer 91, shown as a linear variable differential transformer (LVDT), is mounted on shaft 90 so that movement of shaft 90, which translates to movement of the pedals, as explained above, may be measured for use in determining pedal position in the feedback control system of the invention.

FIG. 4 illustrates an embodiment of the feedback control loop of the flight deck controller backdrive system of the invention. As a preliminary matter, as explained before, the system of the invention is engaged when an aircraft, using a fly-by-wire flight control system, operates under autopilot command. As shown in FIG. 4, in the currently preferred embodiments the autopilot is a subsystem of an autopilot flight director computer that is indicated at computer block 200. In order to engage the backdrive control system of the invention, a command is sent from the autopilot to primary flight computers (PFCs), as shown in block 220. The PFCs direct an initial engage command (from block 220) to a backdrive controller in block 200, which is incorporated in the autopilot flight director computer 200, in FIG. 4. When enabled by the engage command, the backdrive controller directs command signals to each of the backdrive actuators of the appropriate flight deck controllers, indicated at blocks 240 (column), block 242 (wheel), and block 244 (pedals) in FIG. 4. In response to the command signal from the backdrive controller, the actuators of each system engage an electromechanical clutch that connects the actuator drive motors to the output crank arms to apply torque, which positions their corresponding flight deck controller, indicated at blocks 250 (column), 252 (wheel), and 254 (pedals). As was described relative to FIGS. 1–3, positional transducers sense the movement and position of the flight deck controllers. In certain instances, the positional transducers may be linear variable differential transformers (LVDT), indicated at blocks 260 (column), 262 (wheel), and 264 (pedals), but other devices can be employed, as explained above. As is known in the art, a positional transducer, such as an LVDT, provides an analog electrical signal indicating movement (position) relative to a reference position. Since the onboard computers of the aircraft are digital devices, the LVDT signal is converted to a digital signal by an actuator control electronic unit (270). Digitized information representative of flight deck controller position is then transmitted from block 270 back to the primary flight computers in block 220. A position feedback signal is sent to the backdrive controller in block 200. The backdrive controller uses this information to continuously adjust the backdrive actuator command signal. Thus, an error or difference between the position commanded and the actual position, as determined by the LVDT, is determined and the torque command signal is adjusted for the error. In addition to the position feedback provided by the PFCs, the backdrive controller also uses rate feedback directly from tachometers incorporated in the backdrive actuators to enhance control performance, and stability. A torque command signal is transmitted to the appropriate backdrive actuator of blocks 240, 242, and 244. As before, torque is applied to the flight deck controllers of blocks 250, 252, and 254, and the position of these controllers is determined by positional transducers of blocks 260, 262, and 264. Signals from the positional transducers are digitized in block 270 and relayed to the primary flight computer of block 220. This closed-loop feedback control system operates virtually continuously, with a cycle time of less than 10 milliseconds, to null the error signal and thereby drive the flight deck controllers into positions that are indicative of the position occupied by the corresponding flight control surfaces.

The backdrive system of the invention also incorporates an autopilot disconnect or override feature for allowing the pilot to take control from the autopilot by taking physical control of the flight deck controllers, such as by moving the controller from a position dictated by the backdrive system. The autopilot disengage scheme of the invention is insensitive to variations in system characteristics, robust, in the sense of not responding to adverse flight conditions and disturbances, and tolerant of "normal hands-on forces" that might be applied to the controllers when a pilot is in contact with these controllers while the autopilot is engaged. Nevertheless, the system is not so insensitive to disturbances and tolerances that large inputs are required for detection of an override condition. Preferably, when an override is sensed in one flight deck controller, all other flight deck controller autopilot operation is also disengaged.

The autopilot disconnect feature of the invention predicts the response of a flight deck controller in response to autopilot commands and declares an autopilot override condition when an error between the actual position of the controller and the predicted position differs by a predetermined amount. When the difference exceeds this amount, the system recognizes that the controller has been deliberately displaced from its position by the pilot and disengages the autopilot.

Figure 5:
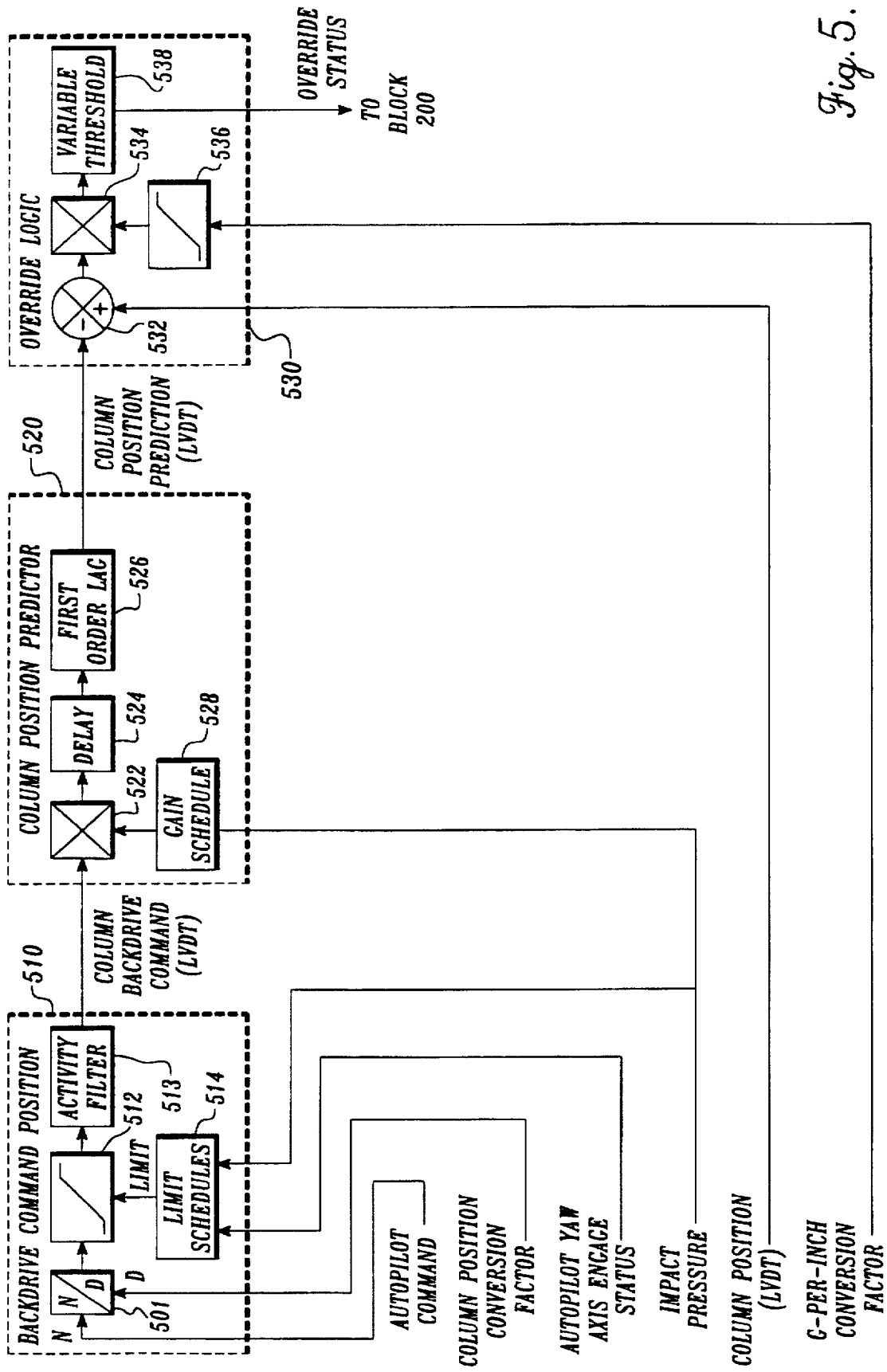
FIG. 5 is a block diagram showing details of an embodiment of a column backdrive override feature of the invention.

An embodiment of the autopilot override feature, specifically directed toward the column controller, is shown in FIG. 5. In the arrangement of FIG. 5, the autopilot command signal (from block 200 of FIG. 4), is coupled to the backdrive command generation block 510. The autopilot pitch command signal is divided by a column position conversion factor at block 501 to convert the autopilot pitch command to an equivalent column position, which is expressed in units of the column position sensor, such as inches of travel for a linear variable differential transformer. This signal is then coupled to a limiter 512 that prevents the backdrive command signal, and consequently the predicted column position, from exceeding the position authority of the column backdrive actuators (10 and 10' in FIG. 1). Limiting the equivalent column sensor signal prevents generation of an error in the predicted column position that could falsely indicate pilot override. Limits for limiter 512 are determined at block 514, which processes input signals representative of impact pressure (related to aircraft velocity) and autopilot yaw axis engagement status. Use of impact pressure signals establishes a limit schedule that mimics the variable feel force that a pilot experiences in normal operation of the column, i.e., higher force needed to move column at high speeds, less force at lower speeds. The autopilot yaw status signal indicates whether the autopilot is operating in cruise or autoland mode (the invention currently is embodied in an aircraft where autopilot yaw control is asserted only during automatic landing sequence). Different limits are set for cruise and autoland because column backdrive torque levels are set higher during autoland to prevent the inadvertent overriding of the autopilot, i.e., to require more column force for pilot intervention. This higher torque level allows a larger travel range, and hence increased command limits, as compared to cruise operation.

With continued reference to FIG. 5, the column backdrive command signal supplied by limiter 512 is directed to an activity filter 513. Activity filter 513 filters out "noise" from an autopilot pitch command so that the dynamics of the column would more closely mimic that of a column under pilot command, i.e., high-frequency motions, such as vibrations of the column are filtered out. In addition to producing a signal that results in column dynamics that more realistically mimic pilot control, activity filter 513 reduces signal bandwidth so that a predicted column can be produced with a low-order prediction model. In that regard, the filtered column backdrive command signal supplied by activity filter 513 is coupled to column position predictor 520.

Column position predictor 520 first multiplies the column backdrive command signal by a gain factor that is a function of aircraft airspeed. More specifically, in FIG. 5, a signal representative of impact pressure is provided by the aircraft air sensors and is transmitted to block 528. In block 528, a gain factor is determined as a function of impact pressure, or some other indication of aircraft airspeed. This gain factor, which is scheduled in accordance with the aircraft's column feel force-airspeed relationship, is then transmitted to block 522 where it is multiplied by the column backdrive command signal. The signal from block 522 is coupled to a delay unit 524 that models the hardware and software delays for the various elements of the control loop, including the ACE, PFC, AFDC, and transmission delays. A first-order lag filter block 526, which is connected to receive the signal supplied by delay unit 524, models the basic dynamic characteristics of the control loop.

The column position prediction generated in block 520 is then transmitted to block 530 that contains the override logic of the autopilot disconnect feature of the invention. A summing unit 532 of block 530 compares the actual column position (output signal of the linear variable differential transformer or other position transducer associated with the column) with the predicted column position signal that is supplied by column position predictor 520. Thus, summing unit 532 produces a difference signal that is equal to the difference between the actual and predicted values of column position. This difference signal, which is in terms of inches of column position transducer displacement, is coupled to a multiplier 534 that converts the signal to g-forces. This is achieved by providing a "g-per-inch" conversion factor to a limiter 536, which provides the conversion factor to multiplier 534. The inches-to-g-force conversion is performed so that the position predictor error can be compared with a threshold that is defined in g-force units. The limiter 536 prevents the effective threshold, expressed in inches, from dropping below the minimum positioning accuracy of the backdrive control system, at high-speed flight conditions. The g-per-inch conversion factor varies with flight speed, since force needed to move the controller varies with speed, as explained above.

Variable threshold logic 538 continuously monitors the prediction error signal provided by multiplier 534, with respect to both the magnitude or absolute value of the position prediction error signal and time duration. An override is declared if the absolute value of the error remains above a threshold value for a period of time that is inversely related to the magnitude of the prediction error. Thus, an override is declared for a large error that exist for a shorter time period than a smaller error. Conversely, a smaller error must exists for a longer time period before an override is declared. Once an override is declared, the autopilot disengages from control of all the flight deck controllers and the pilot resumes manual control of the aircraft.

Figure 6:
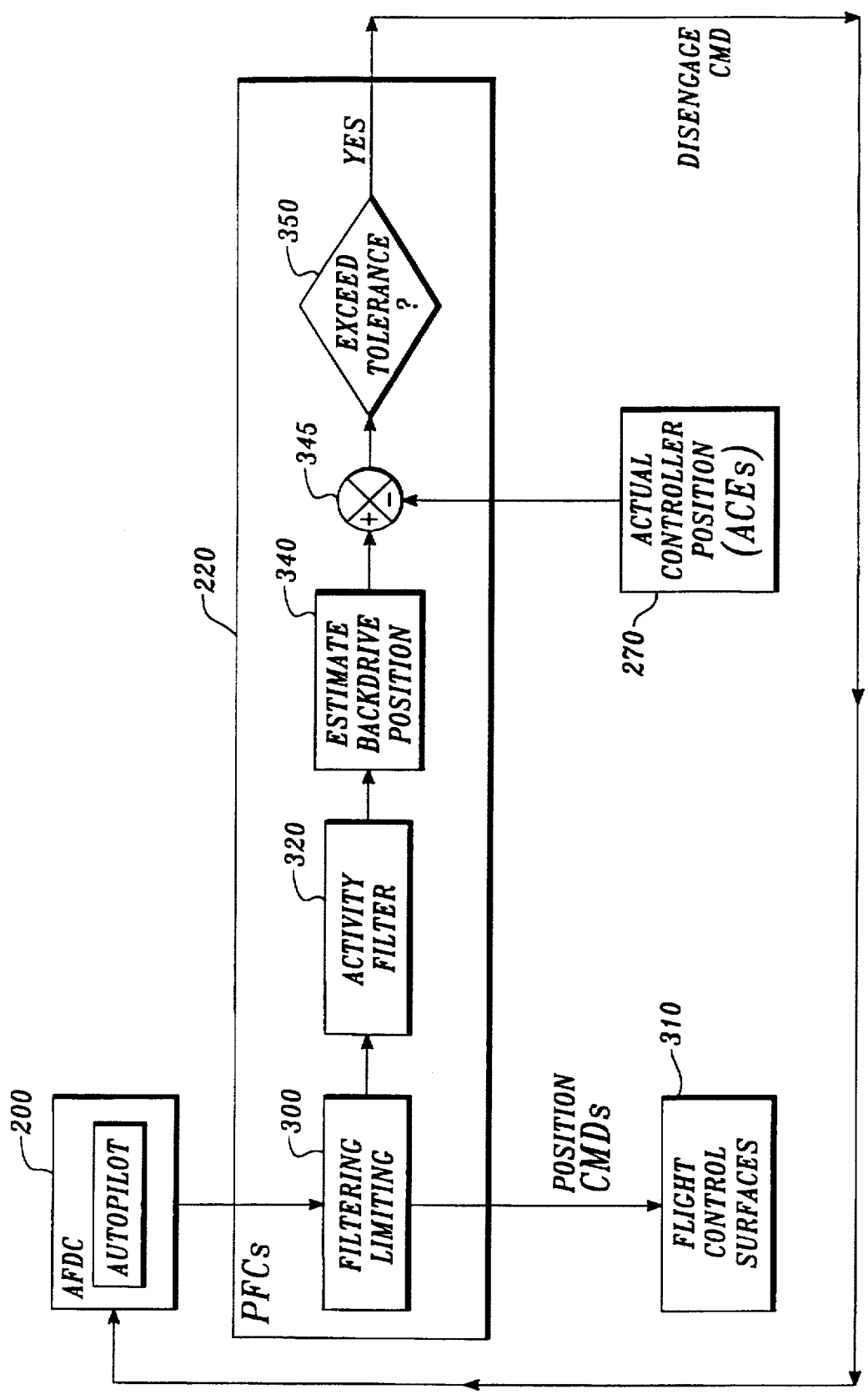
FIG. 6 is a block diagram showing details of an embodiment of a wheel or pedal backdrive override feature of the invention.

The autopilot disengage feature for the wheel and foot pedal controllers is similar to that of the column, described above. However, the backdrive systems are simpler, and an illustrative embodiment common to both is shown in FIG. 6. In general, a position command is sent from the autopilot to a primary flight computer, which in turn transmits a command signal to position the appropriate flight control surfaces. Through a separate path, backdrive commands are generated, for the appropriate wheel or pedal movement, as explained above and as shown in FIG. 4. In general, the primary flight computer also generates a signal estimating the position of backdriven controllers. The actual positions of the wheel or pedal are received from the actuator control electronic units. A comparison is made between the estimated and actual positions of these controllers. If the difference exceeds a predetermined threshold, for a predetermined period of time, then the autopilot is disengaged and the pilot resumes command.

As shown in FIG. 6, a command signal is sent from block 200, the autopilot flight director computer, to flight control surfaces in block 310. Before the command signal reaches block 310, it is, however, filtered in block 300 of block 220 to remove signals that could result in the resonance of the aircraft flight control surfaces. Block 300 also limits signals to ensure that commands do not exceed predetermined limitations placed on movement of the backdrive actuators. These limitations are based on physical travel range of the backdrive actuator and flight deck controller mechanical linkage. Commands must not exceed physical travel range, otherwise an erroneous override condition may occur. The filtered command signals are transmitted from block 300 to block 320, which includes an activity filter. This activity filter removes high-frequency signals to prevent vibration, or "chattering," of the flight deck controllers. Block 340 of 220 estimates the position of backdrive controllers. This is compared with actual position controller input from block 270, the actuator control electronic units, in block 345. If the difference between the estimated backdrive position and the actual position exceeds a predetermined tolerance as determined in block 350, a signal is sent from block 220 to block 200 to disengage the autopilot and backdrive system and return the aircraft to manual control.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A backdrive system for positioning a flight deck controller of an aircraft having a fly-by-wire primary aircraft control system, when the aircraft is flying under control of an autopilot flight director computer, the backdrive system comprising:

(a) a backdrive controller for receiving signals from the autopilot and converting the received signals to signals for positioning the flight deck controller;

(b) an actuator in electrical communication with the backdrive controller, the actuator mechanically coupled to the flight deck controller to move the controller in response to electrical communication from the backdrive controller;

(c) a position transducer in mechanical communication with the actuator for sensing movement of the flight deck controller and for supplying an electrical signal representative of the movement; and (d) an electronic control unit in electrical communication with the position transducer, the electronic unit receiving the signal supplied by the position transducer and processing that signal for sending electrical signals to a primary flight computer, the primary flight computer in communication with an autopilot flight director computer.

2. The system of claim 1, wherein the flight deck controller comprises a flight deck wheel controller; and the system further comprises:

a wheel having a wheel pulley mechanically coupled to the wheel controller so that rotation of the wheel pulley about an axis correspondingly rotates the flight deck wheel controller; and an endless cable extending from around the wheel pulley to a second pulley, nonrotatably mounted to a rotatable shaft, the shaft mechanically coupled to the actuator;

whereby the actuator is mechanically coupled to the flight deck wheel controller.

3. The system of claim 2, wherein the position transducer is mounted on the rotatable shaft to sense rotational movement of the shaft.

4. The system of claim 3, wherein the position transducer comprises a linear variable differential transformer.

5. The system of claim 1, wherein the flight deck controller comprises a flight deck column controller, and the system further comprises:

a first shaft fixedly mounted to a lower end of the column controller so that rotational movement of the first shaft about an axis causes arcuate movement of the column;

a rod extending from the first shaft to a second shaft, the rod having one end mechanically coupled to the first shaft and another end mechanically coupled to a second shaft, the second shaft mechanically coupled to the actuator;

whereby the actuator causes rotational movement of second shaft, the rotational movement of the second shaft causes corresponding rotation of the first shaft, and the rotation of the first shaft causes arcuate column movement.

6. The system of claim 5, wherein the position transducer is mechanically coupled to the second shaft to sense rotational movement of the second shaft.

7. The system of claim 6, wherein the position transducer is a linear variable differential transformer.

8. The system of claim 1, wherein the flight deck controller comprises a fight deck pedal controller, the pedal controller comprising a pair of pedals, each of the pedals comprising a pedal arm extending vertically downward from the pedal, a lower end of the pedal arm mechanically coupled to a rotatable shaft so that the pedal moves arcuately when the shaft rotates about an axis; and the system further comprises:

a horizontally extending rod, having one end mechanically coupled to the shaft, and another end mechanically coupled to a rotatable coupling; the rotatable coupling mechanically coupled to a second rotatable shaft, the second shaft mechanically coupled to the actuator;

whereby movement of the actuator causes rotation of the second shaft, in turn causing reciprocal motion of the horizontal rod, rotation of the first shaft, and arcuate movement of the pedal controller.

9. The system of claim 8, wherein the position transducer is mounted on the second shaft to sense rotational movement of said shaft.

10. The system of claim 9, wherein the positional transducer comprises a linear variable differential transformer.

11. A method of backdriving a flight deck controller of an aircraft operating under control of an autopilot, the aircraft having a fly-by-wire primary aircraft control system, the method comprising:

(a) transmitting a first command signal from the autopilot to a primary flight computer;

(b) transmitting a responsive second command signal from the primary flight computer to a controller for a backdrive actuator;

(c) actuating the backdrive actuator to position a flight deck controller mechanically coupled to the backdrive actuator;

(d) sensing the position of the flight deck controller with a position transducer;

(e) converting the position of the flight deck controller, sensed by the transformer, into a digital electrical signal;

(f) transmitting the converted electrical signal to the primary flight computer;

(g) comparing the sensed position of the flight deck controller with a commanded position of said controller to determine a difference; and (h) transmitting a feedback control signal to the controller of the backdrive actuator, the feedback signal based on the difference of the comparing step.

12. The method of claim 11 further comprising transmitting a rate feedback signal from the backdrive actuator to the controller of the backdrive actuator.

* * * * *

UNITED STATES PATENT AND TRADEMARK OFFICE
CERTIFICATE OF CORRECTION

PATENT NO. : 5,797,564
DATED : Aug. 25, 1998
INVENTOR(S) : Cartmell et al.

It is certified that error appears in the above-identified patent and that said Letters Patent is hereby corrected as shown below:

On the title page, should read

Item [75] Inventors: Daniel H. Cartmell, Bellevue; David B. Borgens, Auburn; Henning Buus, Woodinville; Neal V. Huynh; David W. Lochtie, both of Bellevue, all of Wash.

Signed and Sealed this

Twenty-ninth Day of December, 1998

Attest:

BRUCE LEHMAN

Attesting Officer  Commissioner of Patents and Trademarks